United States Patent
Arsenault

[19]

[11] Patent Number: 5,876,174
[45] Date of Patent: Mar. 2, 1999

[54] APPARATUS FOR TRANSPORTING ELONGATED LOADS

[76] Inventor: Armand Joseph Arsenault, 7649 Diamond Crescent, Sardis, British Columbia, Canada, V2R 3A8

[21] Appl. No.: 677,718

[22] Filed: Jul. 8, 1996

[51] Int. Cl.⁶ .................................................. B60P 3/00
[52] U.S. Cl. .......................... 414/460; 414/23; 414/450
[58] Field of Search ............................ 414/23, 450, 449, 414/731, 911, 461, 460, 540, 626

[56] References Cited

U.S. PATENT DOCUMENTS

| | | | |
|---|---|---|---|
| 572,742 | 12/1896 | Carroll | 414/435 |
| 891,385 | 6/1908 | Strange | 414/460 |
| 2,261,509 | 11/1941 | Williams | 414/460 |
| 2,433,822 | 12/1947 | Bartholomew | 414/460 |
| 2,452,338 | 10/1948 | Thompson | 414/435 |
| 2,679,329 | 5/1954 | Stout | 414/460 |
| 2,893,778 | 7/1959 | Eckstein | 414/23 X |
| 3,549,029 | 12/1970 | Rutter | 414/555 |
| 3,688,932 | 9/1972 | Carter | 414/460 |
| 4,221,525 | 9/1980 | Stedman | 414/731 X |

*Primary Examiner*—Janice L. Krizek

[57] ABSTRACT

An apparatus for transporting elongated loads, such as logs, particularly in small scale logging operations, includes a longitudinally extending body and a transversely extending support member having a center portion connected to the body. Laterally spaced apart left and right legs extend downwardly from the center portion to weight bearing structure cooperating with lower ends of the legs to support the apparatus upon the ground. A load supporting device cooperates with the load and the body to support the load beneath the body. A restricting flexible tension link, for example a length of link chain, cooperates with lower ends of each leg and with a tensioning device which cooperates with the body and applies tension to the links to restrict the legs from excessive movement relative to the body. The apparatus has particular applications in skidding logs where conventional heavy duty skidders are inappropriate because of environmental or economic concerns. The apparatus is light and inexpensive and is towed behind a relatively lightweight recreational all terrain vehicle or snow vehicle.

19 Claims, 5 Drawing Sheets

5,876,174

APPARATUS FOR TRANSPORTING ELONGATED LOADS

BACKGROUND OF THE INVENTION

The invention relates to a trailer for hauling elongated objects, particularly a trailer for towing behind a 3 or 4 wheeled recreational all-terrain vehicle, or a recreational snow vehicle for "skidding" logs from a relatively small forestry harvesting operation.

It is known to skid logs behind heavy duty industrial tractors, commonly called "skidders", which are large articulated rubber-tired vehicles. Such vehicles are costly to operate, and being relatively large require some considerable space for maneuvering, and thus are only appropriate in relatively large "clear-cut" logged areas. Such vehicles are relatively heavy and powerful and can inflict considerable topsoil damage to clear-cut areas, which can present difficulties with more stringent environmental controls that are becoming common for industrial logging operations. Such vehicles are too large, lack maneuverability, and inflict too much damage to the top soil for use in environmentally sensitive "selective logging" or "high retention logging" operations where a large percentage of trees remain standing after logging, and the skidding vehicle must manoeuvre around the standing trees. Prior to industrial clear-cut logging, horses were often used to skid the logs from selectively logged areas, and this caused less environmental damage than the modern heavy industrial equipment used in the clear-cut areas.

When skidding logs it is necessary to lift a forward portion of the log above the ground to avoid the forward portion "digging in" and thus increasing resistance to skidding as well as damaging top soil. With heavy logs, considerable force is required to lift the forward end of the log, even though much of the weight of the log is carried by the rear end of the log in contact with the ground. Various apparatus, e.g. wheeled carriages etc. for skidding logs have been devised, some of which were designed for pulling by horses, whereas others were designed for pulling by motorized vehicles. Such carriages must be ruggedly designed to withstand handling heavy loads combined with indeterminate impact forces from traversing rough terrain, but clearly an excessively heavy carriage detracts from the payload that can be carried. Consequently, the carriage must be an efficient lightweight and strong structure which is sufficiently strong to withstand unpredictable impact forces occurring during use without being so heavy that payload is reduced excessively.

U.S. Pat. No. 2,452,338 (Thompson) discloses a logging cart having a single main tongue extending forwardly from an inverted U-shaped arched axle supporting a pair of wheels. Rigid side bars serve as diagonal braces extending forwardly from lower frame portions above the wheels to connect with the main tongue. A log is supported with a length of chain extending between the wheels and a length of chain adjacent the side bars. The side bars are rigid and thus would interfere with bulky loads and thus limit the width of loads that can be carried. In addition, the side bars are prone to damage during use, and because they are rigid, if they were badly damaged they might twist or "skew" the arched axle so that the wheels become non-aligned with the tongue, thus aggravating wheel wear, top soil damage and increasing pulling loads.

U.S. Pat. No. 819,385 (Strange) discloses a logging cart in which a vertical inverted U-shaped frame carrying wheels is connected to a horizontal U-shaped frame which is towed behind the vehicle. A pair of chains extends from positions adjacent the wheels to a rear end of the log to relieve load from the log on the support. In applicant's opinion, supporting a heavy log in such a structure would likely result in excessive lateral swinging movement of the log relative to the structure, causing erratic loading for the towing vehicle with a risk of unintentional interference of the log with the structure or adjacent obstructions.

U.S. Pat. Nos. 572,742 (Carroll) and 2,679,329 (Stout) disclose wheeled carriages with levering devices for lifting elongated loads.

SUMMARY OF THE INVENTION

The invention reduces the difficulties and disadvantages of the prior art by providing a lightweight trailer which is economical to manufacture and service and can be towed behind a relatively low powered, lightweight recreational vehicle. The apparatus according to the invention can be used by a single operator without use of additional auxiliary equipment, and forward ends of relatively long heavy logs can be easily lifted upwardly by the operator and secured in the apparatus for towing behind the recreational vehicle, or can be moved manually. Portions of the vehicle are strengthened by tensioned flexible tension links which provide a tolerance to impact damage not found in the prior art, thus enabling the apparatus to sustain impact loading which, in the prior art, would commonly require repairing. In addition, the tensioned flexible tension links are adjustable to accommodate bulky loads, which would also not be possible with the prior art.

An apparatus according to the invention is for transporting an elongated load, such as one or more logs, and comprises a body, a support member, weight bearing structure, a load supporting device, a restricting flexible tension link, and a tensioning device. The body is longitudinally extending and has forward and rear end portions. The support member is transversely extending and has a centre portion connected to the body and laterally spaced apart left and right legs extending downwardly from the centre portion to lower ends of the legs. The weight bearing structure cooperates with the lower end of the legs to support the apparatus upon the ground. The load supporting device cooperates with the load and the body to support the load beneath the body. The restricting link cooperates with lower ends of the legs. The tensioning device cooperates with the body and the restricting link to apply tension to the link extending to each leg to restrict the legs from excessive movement relative to the body. The tensioning device is carried on the body at a position forward of the support member and the restricting flexible tension link has left and right forward portions which extend upwardly and forwardly from the lower ends of the left and right legs respectively to the tensioning device. In a heavy duty embodiment of the invention, the restricting flexible tension link also has left and right rear portions which extend rearwardly from the lower ends of the left and right legs respectively to a body link anchor located on the body rearwardly of the support member.

In one embodiment, the load supporting device comprises a load grasping device to grasp the load and a supporting flexible tension link, for example, a chain, cooperates with the lower grasping device. A supporting link anchor is carried on the body and cooperates with the supporting flexible tension link to enhance initial lifting forces on the load and to anchor the supporting flexible tension link against forces from the load. The supporting link anchor comprises a forwardly and upwardly extending ramp to receive the supporting flexible tension link lying thereon. A link engager cooperates with the apparatus and is adapted to engage the supporting flexible tension link to prevent movement of the supporting flexible tension link along the ramp when the link is under load.

A detailed disclosure following, related to drawings, describes a preferred embodiment of the invention which is capable of expression in structure other than that particularly described and illustrated.

DETAILED DESCRIPTION

Figure 1:
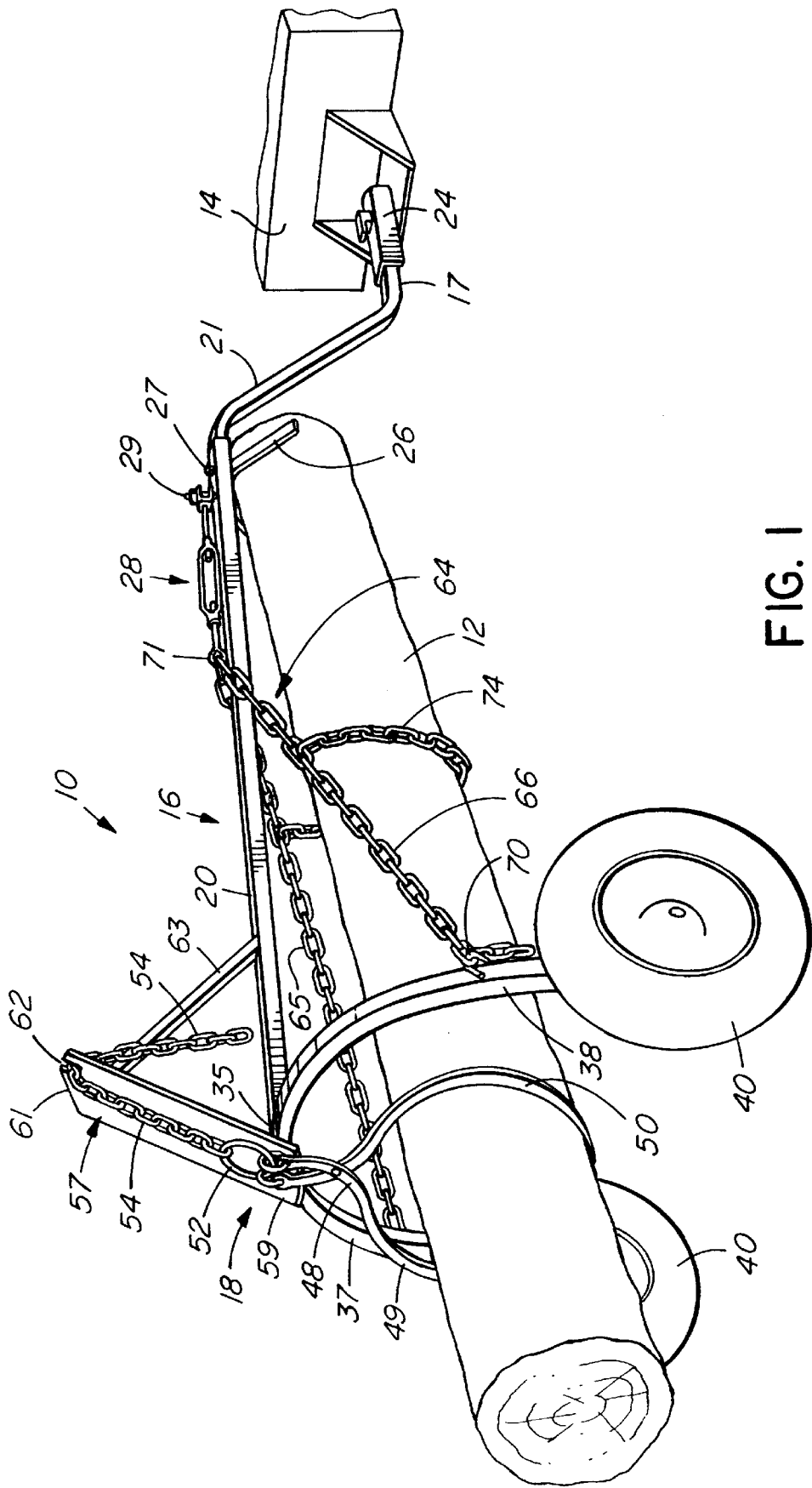
FIG. 1 is a fragmented perspective of a first embodiment of an apparatus according to the invention shown carrying a forward portion of a log and being towed behind a light vehicle.
Figure 2:
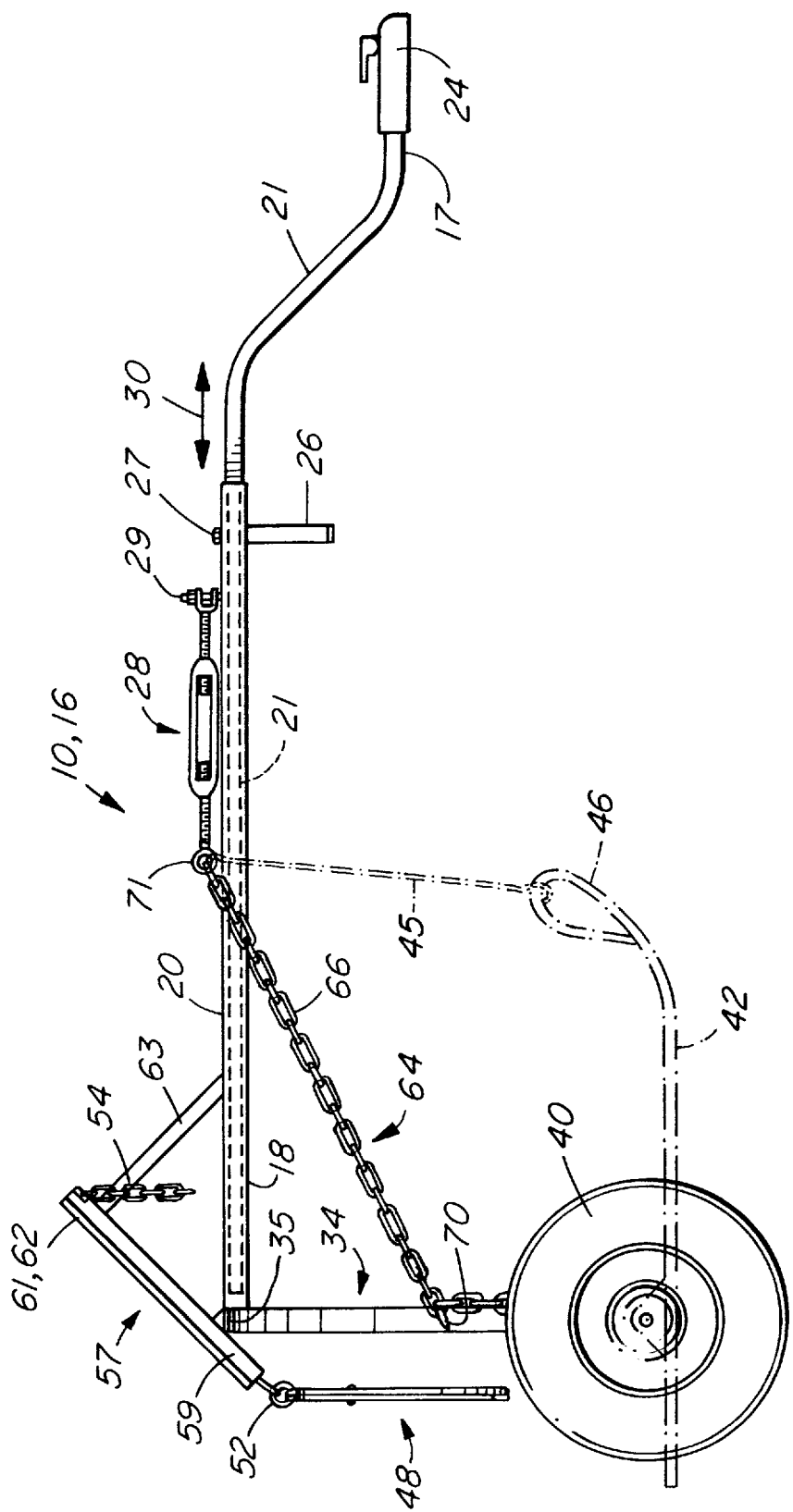
FIG. 2 is a simplified side elevation of the apparatus showing in more detail log carrying and adjustment structure, with two different types of weight bearing structure to support the apparatus on the ground.
Figure 3:
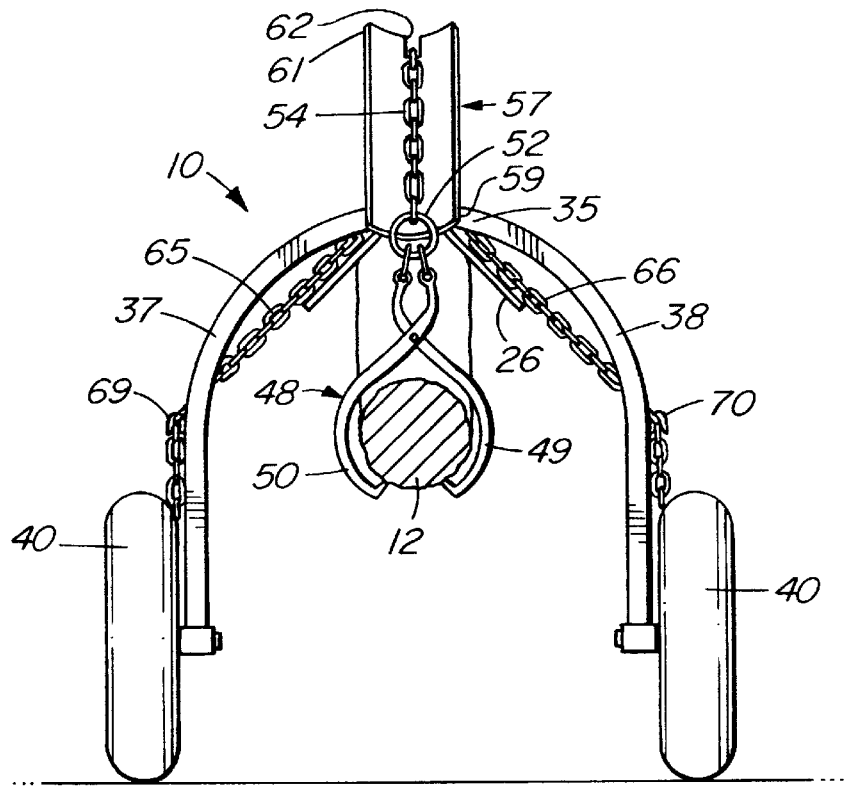
FIG. 3 is a simplified rear elevation of the apparatus carrying a log, the log being shown fragmented.

FIGS. 1 through 3

A first embodiment 10 of an apparatus according to the invention is shown carrying a log 12 and coupled to a rear of a vehicle 14 for towing. The vehicle can be a relatively low powered, lightweight, and economical recreational vehicle, such as a 3 or 4-wheeled all-terrain vehicle (ATV), or a recreational snow vehicle driven by a belt and steered by a pair of skis, commonly called a "snowmobile". Such vehicles are relatively low cost to buy as they are mass-produced, are economical to operate, and are highly maneuverable, and thus are appropriate for use in small scale selective logging operations where many trees remain standing and would normally interfere with a much larger industrial skidder attempting to skid logs between the standing trees.

The apparatus comprises a longitudinally extending body 16 having forward and rear end portions 17 and 18 respectively. Preferably, the body is adjustable for length to accommodate different sized logs and thus has a pair of telescoping body members, namely a tubular rear body member 20, and a forward body member 21 which fits inside the rear body member. The rear body member is straight and hollow to receive a straight portion of the forward body member, shown in broken outline in FIG. 2. A forward end of the forward body member 21 is cranked downwardly and has a conventional tow hitch 24 adjacent the end portion 17 for coupling to the vehicle 14. Alternatively, the member 21 can be inverted so that the tow hitch is cranked upwardly to provide a more convenient height for maneuvering the apparatus by hand. An inverted V-shaped or U-shaped log steady 26 is attached with a vertical bolt 27 passing through aligned openings in the members 20 and 21. The forward body member 21 is provided with a series of vertical openings spaced therealong which cooperates with the bolt 27 to permit telescopic adjustment of the overall length of the body 16 as shown by an arrow 30. A turnbuckle 28 has a forward portion secured to the rear body member 20 with a nut and bolt 29.

The apparatus further comprises a transversely extending support member 34 which has a centre portion 35 releasably connected to the body 16, e.g. by welded brackets and bolts (not shown) to facilitate storage, etc., and similarly is made from a rugged, generally rectangular sectioned tubular member to provide a lightweight stiff structure. The support member 34 has laterally spaced apart left and right legs 37 and 38 extending downwardly from the centre portion 35 to lower ends of the legs to form an inverted U-shape. Left and right wheels 40 are journalled at the lower ends of the legs to serve as a weight bearing structure which cooperates with the lower ends of the legs to support the apparatus on the ground. As seen in FIG. 2, skis 42 can be substituted for the wheels and permit the apparatus to be towed behind a snow vehicle. In this alternative, the skis are hinged for rotation about a horizontal transverse axis, and to prevent ski tips thereof from "digging" into the snow etc., preferably an elastic "bungee" cord 45 is fitted between a ski tip 46 and the body 16 to resiliently support the ski tip higher than the remaining portions of the ski. While an elastic tension link is preferred, clearly any resilient ski connection can be substituted.

Figure 4:
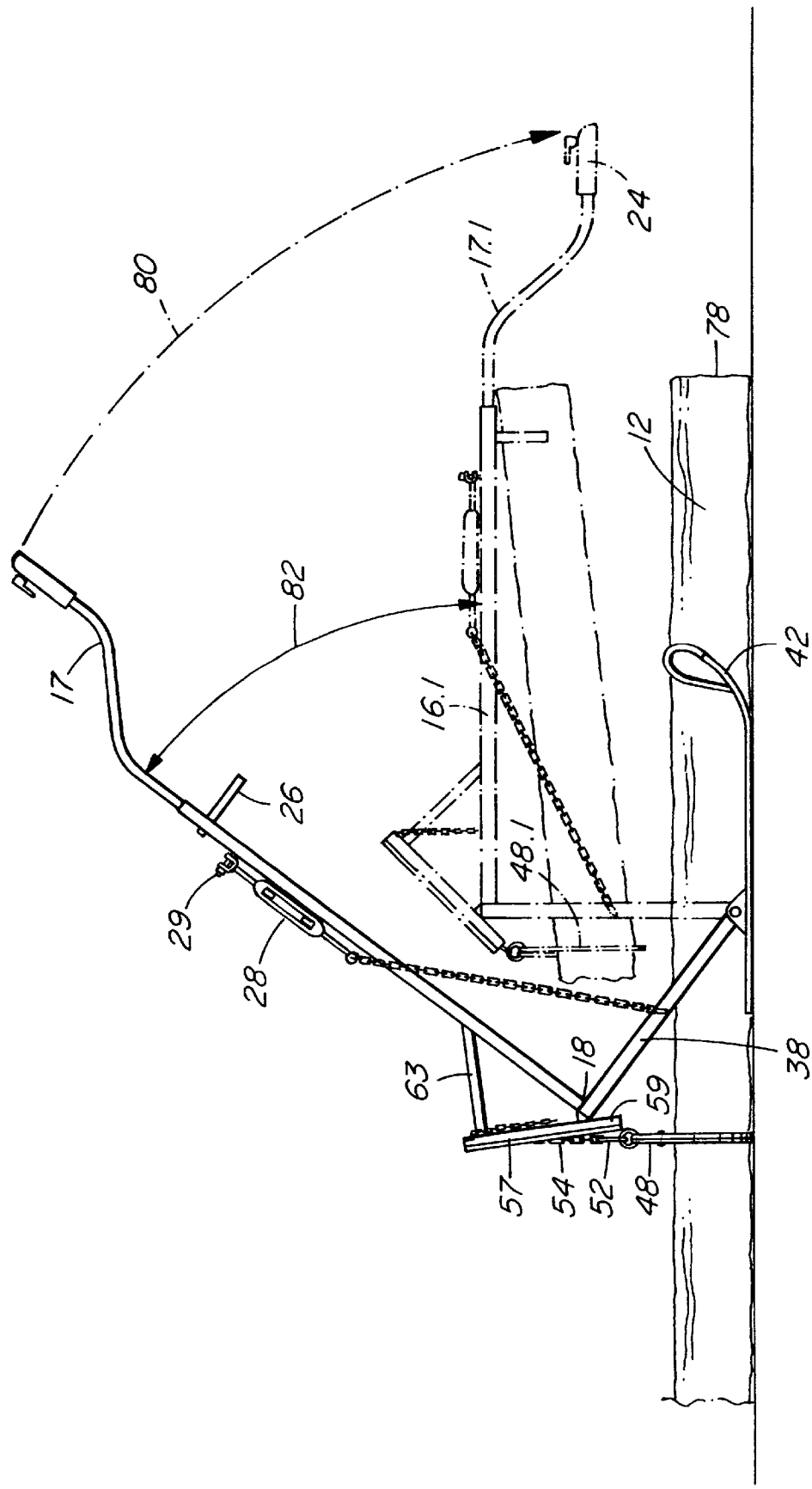
FIG. 4 is a simplified side elevation of the apparatus shown in full outline initially engaging a log supported on the ground, and in broken outline after raising the log from the ground to an operative position.
Figure 6:
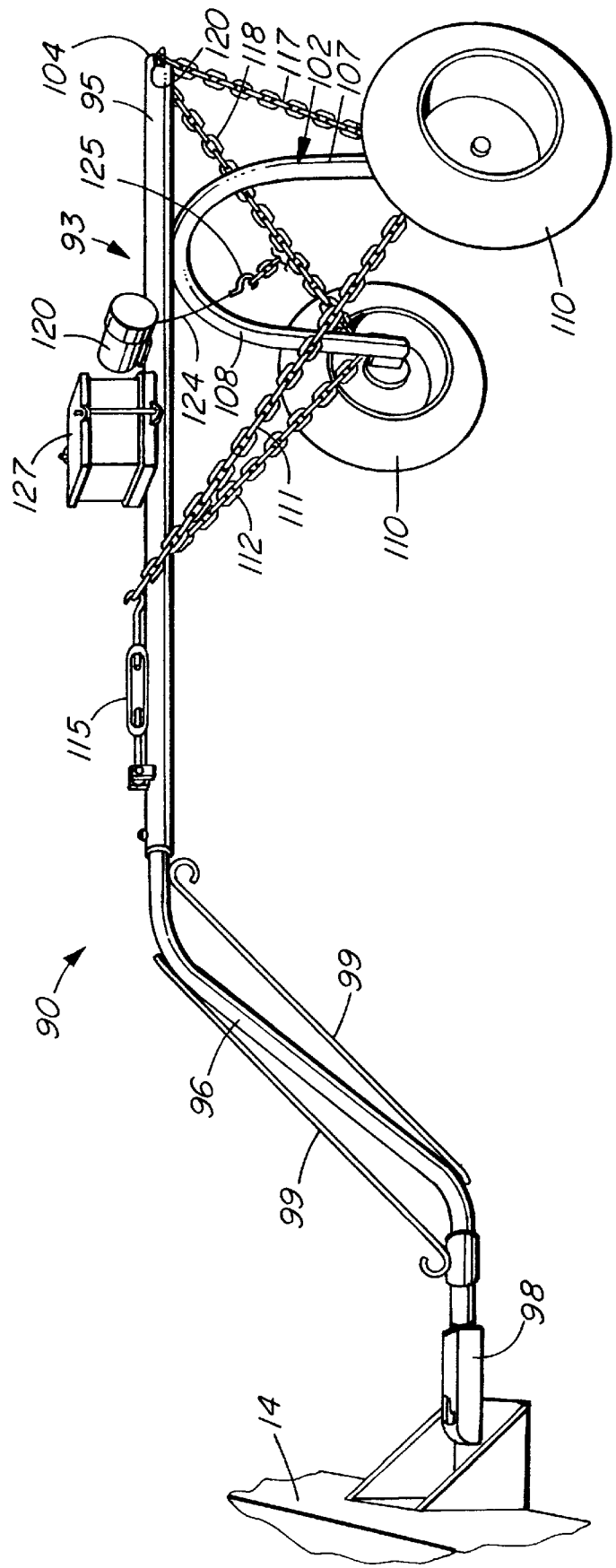
FIG. 6 is a simplified perspective of a second embodiment of the invention which is for carrying heavier loads than the first embodiment.

The apparatus 10 further comprises a self-energizing grapple 48 which has a pair of hinged tong members 49 and 50 which have C-shaped lower ends which engage a log and upper ends connected by a ring 52 which permits relatively easy opening of the grapple when unloaded, and essentially automatic closing of the grapple when loaded. A short length of link chain 54 is connected to the ring 52 and extends over a forwardly and upwardly extending ramp 57 which receives the chain 54 lying thereon. The ramp has a lower end portion 59 which is connected to and extends downwardly and rearwardly from the centre portion 35 of the support member as best seen in FIG. 2. The ramp 57 has an upper end portion 61 located forwardly and above the support member, and is supported by a forwardly and downwardly extending brace 63 which also connects to the body 16. An upper edge of the upper end portion 61 has a vertical slot 62 (FIG. 3) which has sufficient width to engage a link of the chain 54 held vertically, and can restrain the chain against movement through the slot by interference with an adjacent horizontal cross link, thus serving as a link engager to engage a portion of the link to prevent relative movement thereof. Thus, the grapple 48 serves as a load grasping device to grasp the log, and the link chain 54 serves as a supporting flexible tension link which cooperates with the log and the ramp which serves as a supporting link anchor and has a specific use as would be described with the reference to FIG. 4. It can be seen that the grapple 48, the chain 54 and link engager, slot 62, serve as a load supporting device cooperating with the load and the body to support the load beneath the body.

An important aspect of the invention relates to a strengthening structure associated with the transverse support member 34 to strengthen the support member against inadvertent and indeterminate impact loads due to contact with obstructions or following ground undulations, which commonly occur when operating the apparatus in rough terrain. The strengthening structure comprises a length of link chain 64 which provides left and right restricting links 65 and 66 which extend upwardly and forwardly from lower end portions of the left and right legs respectively to the turnbuckle 28 carried on the body 16. The left and right legs 37 and 38 carry left and right leg link anchors 67 and 70 respectively which are short downwardly extending hooks which can engage the links of the chain 64 to serve as anchors for the chain. The turnbuckle 28 is conventional and has a forward end connected to the body 16, and a rear end portion having an eye 71 which cooperates with the length of chain 64. The turnbuckle is carried on the body at a position sufficiently forward of the support member so that the restricting links 65 and 66 pass as a relatively shallow converging V-shape towards the forward portion of the body. In this way, the links 65 and 66 usually avoid interference with most logs but this is not essential as will be explained. Clearly, the chain 64 can be in one length with a split link or other connector passing through the eye 71, or can be two separate lengths provided with hooks to engage the eye 71 or a hook can be substituted for the eye. In any event, the lengths of the links 65 and 66 are adjusted to attain essentially even tension by hooking the appropriate links onto the leg link anchors 67 and 70 so that when the turnbuckle 28 is tightened, the restricting links 65 and 66 are subjected to approximately equal tension so as to balance forces on opposite sides of the member 34 to avoid "skewing" the axles of the wheels 40. Clearly, tension in the restricting links 65 and 66 enhances rigidity of the structure and yet, if subjected to excessive loads can deflect slightly without causing permanent damage to the apparatus. The flexible tension links can also be slackened if necessary to provide additional space to pass around bulky loads, as will be described with the reference to FIG. 5.

If necessary, a supplemental length of chain 74 can hook into and extend generally transversely between the left and right restricting links 65 and 66 so as to embrace and support forward portions of the load so as to restrict any undesirable lateral movement of portions of the load forward of the wheel support. This is particularly appropriate if several logs are carried in the grapple, and some of the logs are insufficiently long to contact the log steady 26 and thus must be supported at a more rearward position than the steady 26 to prevent interference with other objects. Yet a further variation of this alternative is to be described with reference to FIG. 5.

OPERATION

FIG. 4

The apparatus 10 is first positioned in the broken outline position as shown to ensure that a forward end 78 of the log does not project beyond the cranked portion of the forward end portion 17 of the apparatus. Telescopic adjustment of length of the body 16 can be achieved by repositioning of the body members 20 and 21 as described.

The log 12 is shown lying on the ground and is straddled by the legs 37 and 38, the leg 38 only being shown. The skis 42 are shown hinged to the lower ends of the legs, but the description following would apply equally to a vehicle fitted with the wheels 40 as a substitute for the skis.

The operator raises the forward end 17 to be inclined at approximately 45–55 degrees to the horizontal as shown, which automatically lowers the grapple 48 until lower ends of the grapple contact the ground after opening around the log. To ensure that the forward end of the log is raised, the grapple embraces the log at a small distance forwardly of the estimated balance point of the log so that a rear end of the log tends to trail on the ground. The grapple is positioned with respect to the ramp 57 so that the ring 52 is closely adjacent or lying on the lower end portion 59 of the ramp. In this position, for a normal size apparatus 10, a normal sized person can apply a downward force on the end 17 so as to rotate the body 16 in direction of an arrow 80 through an angle 82, typically about 45–55 degrees. When the body assumes the generally horizontal position as shown in broken outline 16.1, the grapple has moved upwardly to the position 48.1, while concurrently lifting at least the forward portion of the log which is now received by the log steady 26. As can be seen, the log steady 26 is a load steadying device cooperating with the body to extend downwardly therefrom to cooperate with the load at a position remote from the grapple, that is remote from the load supporting device.

By comparing the length of the leg 37 or 38 to the length of the body 16, it can be seen that a mechanical advantage or leverage is available to enable a person of normal strength to lift the forward end of a relatively heavy log in this manner. It has been found that for a body 16 having a minimum length of approximately 14 feet (4.3 metres), an operator of average strength can lift a forward portion of the log having a length of about twice the body length, e.g. about 28 feet (8.5 metres), and a maximum diameter of about 12 inches (30 centimetres). Thus the ramp 57 and slot 62 serve as a supporting link anchor carried on the body and cooperating with the supporting link (i.e. the chain 54), to enhance initial lifting forces on the load and to anchor the supporting link against forces from the load.

Usually, no further work is required by the operator apart from hooking the tow hitch 24 to the towing vehicle hitch and driving the vehicle while pulling the load to a required location. Clearly, the apparatus 10 is relatively narrow and is freely hinged to the towing vehicle, thus simplifying maneuvering of the vehicle and apparatus between standing trees of a selectively logged area. In addition, as the vehicle and apparatus are relatively light, the vehicle can retrieve logs from environmentally sensitive areas with relatively low impact on the top soil. Clearly, if the towing vehicle is a snowmobile, which operates in a reasonable depth of snow, very little damage will be incurred by the top soil, which of course is largely protected by the snow. Because of the relatively low costs of operation of the towing vehicle and the invention, the apparatus can operate economically to retrieve relatively small logs that might otherwise be abandoned with conventional skidders that are so costly to operate. In this way, there would be an application of the present invention for use in clear cut logging sites where use of the conventional heavy duty skidders would not be appropriate economically, or environmentally. It is added that dimensions of the body 16 and of the log can be adjusted so that the load on the tow hitch 24 of the vehicle is increased sufficiently to enhance traction of the drive wheels, thus reducing any tendency of the drive wheels to lose traction.

ALTERNATIVES

While the apparatus is shown skidding logs, other elongated loads can be transported, e.g. lengths of pipe. To avoid skidding the pipes, two similar apparatus can be used concurrently, i.e. one apparatus supporting each end of the pipe or bundle of pipes.

FIG. 5

Figure 5:
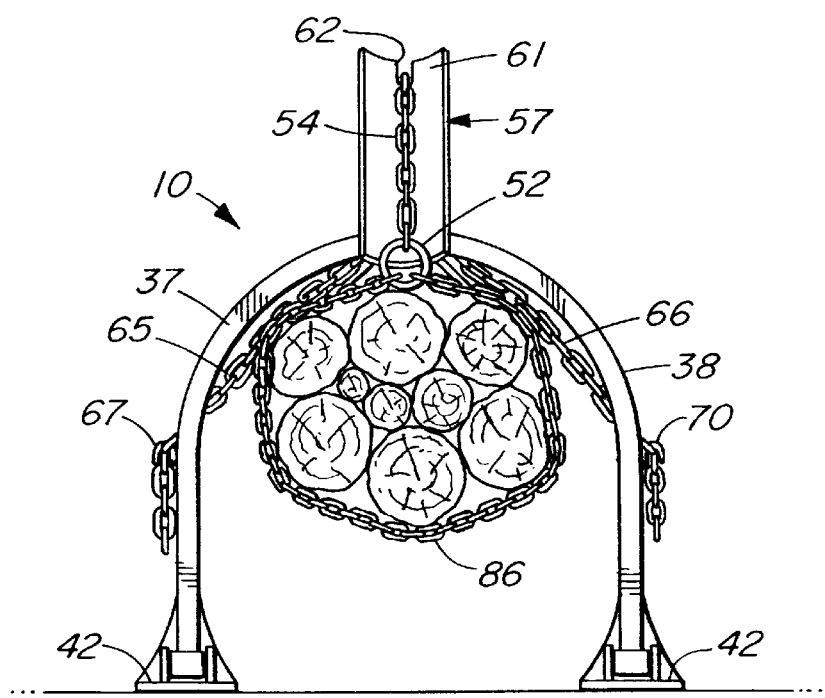
FIG. 5 is a simplified end elevation, generally similar to FIG. 3, showing a bundle of logs carried by the apparatus in an alternative load supporting device.

As stated previously, bundles of logs can be transported by the apparatus 10, and in some instances such bundles are best transported by eliminating the grapple 48 and substituting a loop of chain 86 which has opposite ends connected to the ring 52 as shown. With the grapple eliminated, the loop of chain 86 is passed under the logs, and both ends are connected, e.g. hooked, to the ring 52 to facilitate lifting as before described with respect to the grapple. In such an arrangement, the logs of the bundle are arranged to have approximately equal bulk at either end of the bundle, but usually one end is bulkier than the other. If that is the case, the bulkier end is normally the rear end and the less bulky end is located adjacent the front of the apparatus. Nevertheless, in such circumstances the front end of the load can be wider than adjacent spacing between the links 65 and 66, which are thus deformed outwardly as shown in FIG. 5. In these circumstances, to avoid permanent deformation or strain of the apparatus, the turnbuckle 28 is loosened so that the links 65 and 66 are initially slackened somewhat to enable the forward portion of the bundle of logs to be positioned as close to the log steady 26 as possible, and then the turnbuckle is tightened as before. If there is insufficient length adjustment for the turnbuckle 28 to accommodate the bulk of the forward portion of the log bundle, the links 65 and 66 can be disconnected from the leg link anchors 67 and 70 and different links engaged by the leg link anchors to provide sufficient length in the links 65 and 66. Clearly, when the turnbuckle is tensioned, the links 65 and 66 deform outwardly slightly as shown as they pass around the bundle, and thus do not assume a straight line as shown in FIGS. 1 through 3. The forward end of the log bundle is thus retained partially between the links 65 and 66 which are tensioned sufficiently to essentially eliminate any lateral swinging of the forward portion of the log bundle. If necessary, the supplemental length of chain 74 (see FIG. 1) can also pass around the forward portion of the logs and extend from the links 65 and 66. Thus, the use of flexible link chains for the restricting links 65 and 66 has the added advantage of accommodating bulky loads, assisting to restrict bulky loads from lateral movement, as well as providing a lightweight sturdy structure which is easy to assemble and disassemble and strengthens the connection of the support member 34 to the body 16.

FIG. 6

A second embodiment 90 of the apparatus according to the invention is for carrying loads heavier than those carried by the first embodiment and thus, in general, is fabricated with components which are larger and heavier than the embodiment 10. The embodiment 90 has a body 93 which comprises telescopic rear and forward body members 95 and 96, i.e. at least the member 95 is tubular to receive the member 96 to provide length adjustment for the body 93. Similarly to the forward body member 21 of FIG. 1, the forward body member 96 is cranked to extend downwardly and forwardly to a tow hitch 98, with reinforcing struts 99 extending between upper and lower portions of the forward body member. To increase strength of the body, one or more additional tubes can cooperate with the rear body member 95. The apparatus 90 further comprises an inverted U-shaped transversely extending support member 102 which is connected to a portion of the rear body member 95 forwardly of an end 104 of the rear body portion. The support member 102 has left and right legs 107 and 108 which have respective lower ends providing bearings for wheels 110, although skis could be substituted as previously described.

The embodiment 90 differs from the embodiment 10 by providing additional reinforcing to restrict the support member 102 from undesirable movement with respect to the body as follows. Similarly to the embodiment 10, the apparatus 90 includes left and right forward restricting links 111 and 112 respectively which extend upwardly from lower end portions of the legs 107 and 108 to a turnbuckle 115 mounted adjacent a forward portion of the rear body member 95. As well, the restricting flexible tension link also has left and right rear restricting links 117 and 118 which extend rearwardly and upwardly from the lower end portions of the left and right legs respectively to a body link anchor 120 located on the end 104, that is rearwardly of the support member. As before, the lower ends of the restricting links are connected to lower end portions of the legs by leg link anchors, not shown, similarly to the anchors 67 and 70 of FIG. 3. Preferably, for simplicity, the restricting flexible tension link comprises two portions, namely left and right portions although a single length of chain could also be used. The left portion extends as a continuous length forwardly from the body anchor 120, downwardly as the link 117 to a leg link anchor on the left leg, and upwardly as the link 111 to the turnbuckle 115, which serves as a tensioning device as before. Similarly, the right portion of the flexible tension link extends from the body anchor as a continuous length forwardly and downwardly as the link 118 to the leg link anchor on the right leg and upwardly as the link 112 to the turnbuckle. As before, the particular link engaged by the leg link anchor on each side is selected to ensure that, when the turnbuckle is adjusted, the left and the right restricting flexible tension links are subjected to approximately equal tension so that the support member 102 is not skewed with respect to the body.

Another difference from the embodiment 10 relates to the means of lifting the logs to be supported beneath apparatus. As the logs that can be transported by the embodiment 90 tend to be much larger and heavier than logs to be transported by the embodiment 10, manual log loading using the ramp 57 is eliminated and an alternative load supporting device substituted. The alternative comprises an electrically operated winch 122 which controls a length of cable 124 which has a hook 125 or grapple, not shown, at an outer end thereof. The hook cooperates with a sling to bundle logs, and the grapple grasps a log or logs as before. The winch is powered by an electrical storage battery 127 carried on the body as shown and thus can lift much heavier loads than those lifted by the apparatus 10.

In summary, both embodiments of the invention comprise at least one restricting flexible tension link cooperating with a lower end of each leg to restrict the legs against movement relative to the body. Preferably, the flexible tension link is at least one length of link chain, because the links permit easy connection of links in increments to link anchors on the body, or to the tensioning device. Clearly, an alternative flexible cable could be substituted for the links, provided eyes on the cables are correctly located to engage the link anchors on the legs and cooperate with the turnbuckle. While a turnbuckle is shown functioning as a tensioning device, other tensioning devices can be substituted provided the devices cooperate with the body and the flexible tension link to apply tension to the link extending to each leg to restrict the legs from excessive movement relative to the body.

What is claimed is:

1. An apparatus for transporting an elongated load, the apparatus comprising:
   (a) a longitudinally extending body having forward and rear end portions,
   (b) a transversely extending support member having a centre portion connected to the body and laterally spaced apart left and right legs extending downwardly from the centre portion to lower ends of the legs, (c) weight bearing structure cooperating with the lower ends of the legs to support the apparatus upon the ground, (d) a load supporting device cooperating with the load and the body to support the load beneath the body, (e) a restricting flexible tension link cooperating with the lower end of each leg, and (f) a tensioning device cooperating with the body and the restricting flexible tension link to apply tension to the link extending to each leg to restrict the legs from excessive movement relative to the body.

2. An apparatus as claimed in claim 1, further comprising:

(a) a load steadying device cooperating with the body to extend downwardly therefrom to cooperate with the load at a position remote from the load supporting device.

3. An apparatus as claimed in claim 1, in which:

(a) the tensioning device is carried on the body at a position disposed forwardly of the support member, and (b) the restricting flexible tension link has left and right forward portions which extend upwardly and forwardly from lower end portions of the left and right legs respectively to the tensioning device.

4. An apparatus as claimed in claim 3, in which:

(a) the restricting flexible tension link has left and right rear portions which extend rearwardly and upwardly from the lower end portions of the left and right legs respectively onto a body link anchor located on the body rearwardly of the support member.

5. An apparatus as claimed in claim 4, in which:

(a) the left and right legs support left and right leg link anchors respectively located adjacent the lower end portions of the legs, and (b) the restricting flexible tension link comprises left and right restricting link portions, the left link portion extending as a continuous length forwardly from the body anchor, downwardly to the leg link anchor on the left leg, and upwardly to the tensioning device; and the right link portion extending as a continuous length forwardly from the body anchor, downwardly to the leg link anchor on the right leg, and upwardly to the tensioning device.

6. An apparatus as claimed in claim 1, in which the load supporting device comprises:

(a) a load grasping device to grasp the load, (b) a supporting flexible tension link cooperating with the load grasping device, and (c) a supporting link anchor carried on the body and cooperating with the supporting flexible tension link to enhance initial lifting forces on the load and to anchor the supporting flexible tension link against forces from the load.

7. An apparatus as claimed in claim 6, in which the supporting link anchor comprises:

(a) a forwardly and upwardly extending ramp to receive the supporting flexible tension link lying thereon, and (b) a link engager cooperating with the apparatus and adapted to engage the supporting flexible tension link to prevent movement of the supporting flexible tension link along the ramp when the link is under load.

8. An apparatus as claimed in claim 7, in which:

(a) the ramp has a lower end portion adjacent the support member and an upper end portion located forwardly and above the support member, and (b) the link engager is provided adjacent the upper end portion of the ramp to engage a portion of the link to prevent relative movement thereof.

9. An apparatus as claimed in claim 1, in which:

(a) the forward end portion of the body has a tow hitch for connecting to a towing vehicle.

10. An apparatus as claimed in claim 1, in which:

(a) the support member is located closely adjacent the rear end portion of the body.

11. An apparatus as claimed in claim 1, in which:

a) the tensioning device is a turnbuckle.

12. An apparatus as claimed in claim 1, in which:

(a) the load supporting device is a cable controlled by an electrically operated winch.

13. An apparatus as claimed in claim 1, in which:

(a) the support member has an inverted U-shape.

14. An apparatus as claimed in claim 1, in which:

(a) the restricting flexible tension link is a length of link chain.

15. An apparatus as claimed in claim 3, further comprising:

(a) a supplemental portion of flexible tension link, the supplemental portion extending generally transversely between the left and right forward portions of the flexible tension link so as to embrace and support the load.

16. An apparatus as claimed in claim 1, in which:

(a) the weight bearing structure comprises left and right wheels fitted to the lower ends of the left and right legs respectively.

17. An apparatus as claimed in claim 1, in which:

(a) the weight bearing structure comprises left and right skis hinged to the lower ends of the left and right legs respectively.

18. An apparatus as claimed in claim 17, in which:

(a) each ski has an upwardly turned ski tip having a link anchor thereon, and (b) an elastic tension link extends between each link anchor and the body to resiliently support the ski tip higher than remaining portions of the ski.

19. An apparatus as claimed in claim 2, in which the load steadying device comprises:

(a) left and right downwardly extending embracing arms which resemble an inverted U- or V-shape.

* * * * *